Figure 1:
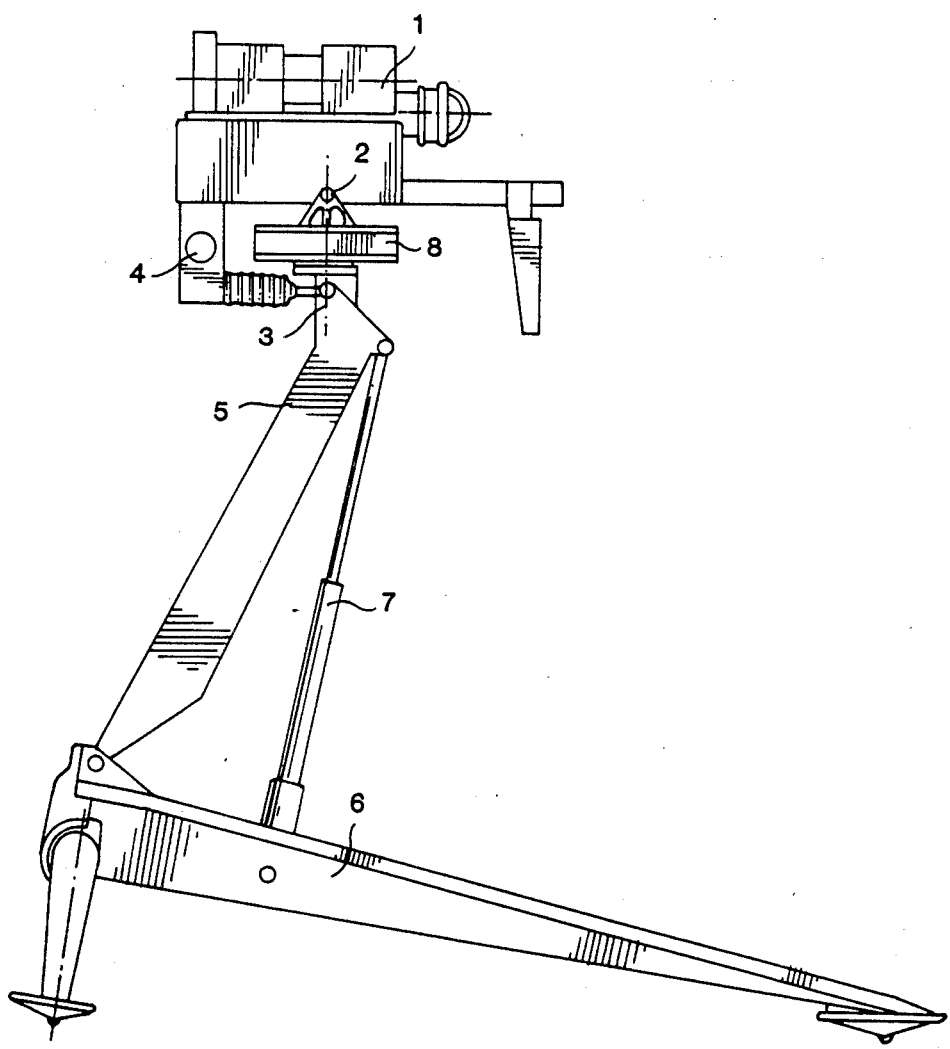

United States Patent [19]

Johansson

[11] Patent Number: 4,572,337
[45] Date of Patent: Feb. 25, 1986

[54] AZIMUTH DAMPER

[75] Inventor: Arnold Johansson, Karlskoga, Sweden

[73] Assignee: Aktiebolaget Bofors, Bofors, Sweden

[21] Appl. No.: 597,157

[22] PCT Filed: Jun. 14, 1983

[86] PCT No.: PCT/SE83/00241
§ 371 Date: Feb. 6, 1984
§ 102(e) Date: Feb. 6, 1984

[87] PCT Pub. No.: WO84/00061
PCT Pub. Date: Jan. 5, 1984

[30] Foreign Application Priority Data
Jun. 14, 1982 [SE] Sweden ................ 8203657

[51] Int. Cl.$^4$ ................................ F16F 9/30
[52] U.S. Cl. ........................ 188/268; 74/574
[58] Field of Search ........... 188/268, 290, 306, 130; 74/574

[56] References Cited

U.S. PATENT DOCUMENTS

| 1,001,065 | 8/1911 | Mursch | 188/290 X |
| 2,514,137 | 7/1950 | O'Connor | 180/290 |
| 2,614,896 | 10/1952 | Pierce | 188/268 X |
| 2,775,317 | 12/1956 | Sinesteara | 188/290 X |
| 3,517,946 | 6/1970 | Rumsey et al. | 188/268 X |
| 3,907,079 | 9/1975 | Chapman | 188/290 |

FOREIGN PATENT DOCUMENTS 1194185  6/1970  United Kingdom .

Primary Examiner—Duane A. Reger
Attorney, Agent, or Firm—Pollock Vande Sande & Priddy

[57] ABSTRACT

Fluid damper for damping aiming movements, for instance when tracking a target. The damper comprises a substantially disc-shaped cylindrical housing (9) in which a drum-wheel (11) is supported for rotation so that an inner gap spacing (24) is provided between the drum-wheel and a slipping ring (14) integrated in the outer cylindrical wall (13) of the damper housing. Said gap spacing (24) is filled with a high-viscosity damping fluid so that a damping torque is obtained which is linearly increasing to the angular velocity for velocities up to a certain level but which are limited for velocities exceeding said level due to the fact that the slipping ring (14) starts rotating with respect to the other parts of the damper housing. The slipping ring (14) is made of a material which is temperature stable and which can be made with a high accuracy with respect to its dimensions for instance carbon-fibre reinforced epoxy resin.

10 Claims, 2 Drawing Figures

AZIMUTH DAMPER

The present invention relates to a fluid damper for damping aiming movements, for instance when tracking a target. The damper comprises a substantially disc-shaped cylindrical damper housing in which a drum wheel is supported for rotation so that an inner gap spacing is provided between the drum wheel and the damper housing which gap is filled with a highly viscous damping fluid.

For following a target or other object with high aiming accuracy it is necessary to introduce some sort of damping means for damping the aiming movements. Specifically in military applications some weapon systems require an accurate optical tracking of a target. For example in a portable missile launcher optical tracking of a target is provided for throughout the entire flight of the missile by the operator keeping the line of sight on the target. An accurate tracking is not required, however, only in military applications; also in civilian applications, such as optical sighting devices, television and cinematographic cameras, an accurate tracking is often required.

Waver, overshoot and other undesirable effects of a human operator should be eliminated by the damper. Even a very small deviation of the guidance control signals in response to waver is capable of causing a deviation in the missile trajectory so that the missile passes at the side of the target. Prior dampers which have been used for limiting such undesired deviations have usually been of the fluid damper type. In this case the necessary damping is provided by means of a highly viscous fluid which fills one or more gaps between a rotatable disc and some part of the damper housing. Such a damper generally provides for a linearly increasing damping torque to the angular aiming velocity. This means an increasing resistance to rapid aiming velocities which is usually no problem during the target tracking phase at which only low angular velocities are required. During target acquisition, however, when rapid slewing about the azimuth or elevation axes often is required, the torque of a conventional damper is often too high. It is therefore previously known to provide the damper with disengaging or overriding means to limit the increasing torque required at higher angular velocities specifically slipping couplings such as a maximum torque coupling.

In Swedish Pat. No. 74.13625-0 a fluid damper with a nonlinear damping is described which provides for an optimal and critical damping for low angular velocities but in which the damping torque has been limited for higher annular velocities so that rapid slewing for instance during target acquisition is facilitated. A highly viscous damping fluid as used in said patent gives a substantial damping of high-frequency vibrations such as trembling, jitter or the like caused by the human operator. The viscosity of the damping fluid has been decreased at higher shear rates by means of a specific design of the fluid gap of the damper.

It is evident that a nonlinear damping torque is required in such a way that the damping torque is linearly increasing up to a certain angular velocity, for instance 30 to 40 mrad/s, which corresponds to normal target tracking. For higher velocities, however, the increase of damping torque is limited and a low, constant damping torque is desired for angular velocities above said level. It has been difficult, however, to provide for such an ideal damping characteristic and it is also evident from FIG. 3 of said patent that no constant damping torque is obtained for higher angular velocities corresponding to the target acquisition phase. Especially at low temperatures the damping torque will be too high. This is unsatisfactory especially in portable weapon systems of the light-weight type in which a too high torque very easily brings the weapon out of position during target acquisition.

Accordingly, it is an object of the present invention to provide a fluid damper with high aiming accuracy for low aiming velocities i.e. velocities up to approximately 30 mrad/s, but in which the linear increase of the damping torque is minimized for velocities exceeding said value to permit a rapid target acquisition.

It is also evident that the damping torque of a fluid damper clearly depends on the temperature. As there is a general requirement for a weapon system to have an acceptable function over a temperature range of at least $-30°$ C. to $+60°$ C. some sort of temperature compensation is required.

Another object of the invention is therefore to provide a fluid damper with a damping torque and a temperature dependence as small as possible within a large temperature range, but which is still designed to withstand military field use, has a light weight and inexpensive design.

A main characterizing feature of the invention is that said fluid gap spacing is formed between the peripheral, cylindrical surface of the drum wheel and a slipping ring integrated in the outer cylindrical wall of the damper housing to the desired maximum torque coupling.

The maximum damping torque can be easily controlled by adjusting the clamping force of the slipping ring within the damper housing. By making the slipping ring of a material which is substantially in dependent of the temperature, preferably a carbon fibre reinforced epoxy resin material, a good temperature compensation is obtained.

In the following the invention will be described more in detail in connection with the accompanying drawings which illustrate a preferred embodiment of the invention.

Figure 2:
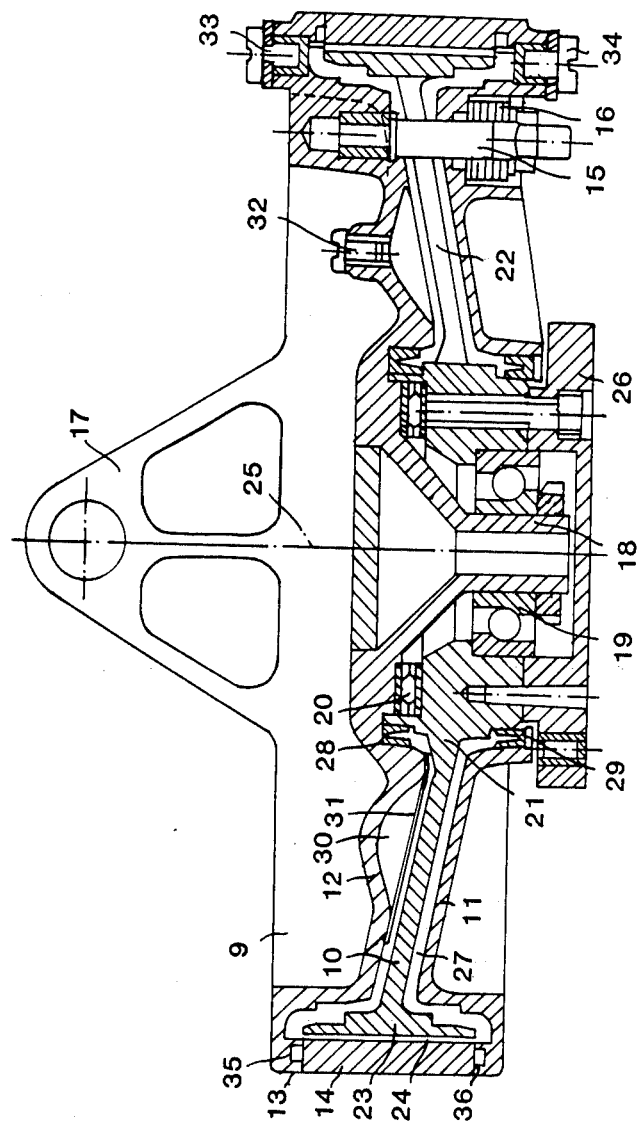

FIG. 1 is a schematic view of a target tracking device provided with a damper for the traverse movements; and FIG. 2 is a sectional view of the damper according to the invention.

FIG. 1 schematically illustrates a target tracking device to be incorporated for instance in a weapon system in which the operator should keep the line of sight on a target with high aiming accuracy. The target tracking device further comprises an optical sight 1 through which the target and its background can be observed by the operator.

In order to make it possible to follow a moving target the sight is supported for rotation in both elevation and traverse, i.e. about a horizontal elevation axis 2 and a vertical azimuthal axis 3. The sight is aimed by the operator by means of a handle 4.

The sight 1 is mounted on a support 5 provided with a tripode 6 supported on the ground. The support is provided with telescopic legs 7 to permit the support to be raised and lowered.

In order to improve the target tracking operation an azimuth damper 8 is arranged between the support 5 and the sight 1. The damper comprises two main parts which are supported for rotation relative to each other about an axis of rotation which coincides with the azimuthal axis. The damper is described more in detail in connection with FIG. 2 below.

As already mentioned in the introductory portion of our specification a damper is required for eliminating undesired vibrations such as human trembling or waver and overshoot. In this case a damper is used only for the azimuthal axis but of course a damper could be used also for the elevation axis. For a weapon system, however, a damper for the azimuthal axis is more important as both the angular velocity and acceleration about the azimuthal axis exceeds the same for elevation axis.

FIG. 2 shows one example of a damper according to the invention. The damper comprises a substantially cylindrical, thin outer housing 9 in which a drum wheel 10 is supported for rotation. The housing 9 comprises a circular bottom part 11 and an upper circular cover 12 so that the damper housing forms a substantially I-shaped section. The damper housing 9 further comprises a slipping ring 14 integrated in the cylindric wall 13 of the housing which ring will be described more in detail below. The bottom part 11 and the cover 12 are held together by means of a number of screws 15, preferably three, which are distributed about the peripheral, cylindrical flange of the housing. In order to be able to adjust the joining force between the two parts of the housing and thereby also the clamping of the slip ring 14 the screws 15 are provided with a package of cup springs 16.

The cover 12 of the damper housing is provided with means 17 for connecting the damper to the rotatable optical sight 1. The center of the cover is provided with a hollow shaft 18 on which the drum wheel 10 is supported for rotation by means of an angular contact ball bearing 19 as well as a nail bearing 20.

The drum wheel 10 is provided with a corresponding inner hub 21 supported on the damper housing, three spokes 22 extending in the small annular gap of the housing and an outer ring 23 conforming to the slip ring 14 so that a small gap spacing 24 is formed between the outer cylindrical surface of the drum wheel and the slip ring. The spokes of the drum wheel are formed so that the drum wheel can be turned an angle of ±45° about the axis 25 before the movement is prevented by the joining screws 15. The inner hub 21 of the drum wheel is provided with a fastening plate 26 for mounting on the support 5 of the target tracking device.

The desired damping of the aiming movements are provided by means of the annular gap 27 formed between the drum wheel and the damper housing which gap also includes said gap spacing 24 and which is filled with a high velocity damping fluid. The fluid gap 27 is sealed by means of two annular, fluid-tight dynamic seals 28, 29 arranged between the hub 21 of the drum wheel and the cover and bottom part of the damper housing. By locating the fluid-tight seals comparatively close to the rotational axis 25, the friction loss in the seals is minimized, but on the other hand the fluid volume is rather large, which means that specific means are required to even out the pressure differences of the fluid. Therefore the cover 12 of the damper housing is provided with an additional spacing 30 connected to the fluid gap but divided from it by means of a membrane 31. The additional spacing is also provided with an airing screw 32. The peripheral flange of the damper housing is provided with screws 33, 34 for filling and draining the damping fluid. The outer part of the fluid gap is also sealed by means of two O-rings 35, 36 disposed between the slipping ring and the cover and bottom part of the damper housing, respectively.

The damper fluid, e.g. silicone oil, should have a viscosity of approximately $10^{-6}$ centistokes at room temperature. The dimension of the gap spacing 24 is approximately 0.2 millimeters at room temperature for producing a suitable damping torque.

If the target tracking device is incorporated in a portable weapon system it is important that the damper has a light weight. In order to reduce the weight of the damper the housing and the drum wheel is preferably made of magnesium. The slipping ring is made of a carbon fibre reinforced epoxy resin, which material is light and strong and which can be made with a high precision with respect to its dimensions which is very important considering the very small dimension of the gap spacing. This material is also very stable at different temperatures, its thermal expansivity is practically zero for the temperature range in question. This will automatically give a temperature compensation as the gap is formed between the slipping ring made of epoxy resin) and the drum wheel (made of magnesium).

The described fluid damper has a linearly increasing damping torque to angular velocity for velocities up to approximately 40 mrad/s. For angular velocities exceeding this level the damping torque is limited and substantially constant due to the fact tht the start friction of the slipping ring has been reached and the slipping ring starts to be rotated with respect to the other parts of the damper housing.

The invention is not limited to said embodiment but can be varied within the scope of the accompanying claims. Even if the invention is described in connection with a light-weight portable weapon system it should be understood that the damper can be used also in other applications in which a damping of aiming movements is desired. The outer slipping ring 14 which is an important part of the damper is not necessarily made of a carbon-fibre reinforced epoxy resin only; in applications in which the requirement of temperature stability is not soo high a steel slipping ring can be used.

I claim:

1. A fluid damper for damping aiming movements comprising:
    a substantially disc-shaped, cylindrical damper housing having a bottom part and a cover;
    a drum wheel secured between said bottom part and said cover and supported for rotation in said housing;
    a slipping ring said slipping ring being secured to permit sliding movement between said slipping ring and said damping housing when a specific damping torque is exceeded, and integrated in an outer cylindrical wall of said damper housing,
    said slipping ring further being spaced from a peripheral, cylindrical, surface of said drum wheel to provide an inner gap spacing therebetween; and
    a highly viscous damping fluid disposed within said gap between said slipping ring and the peripheral cylindrical surface of said drum wheel.

2. A fluid damper according to claim 1 wherein said bottom part and said cover of the damper housing are held together by means of a plurality of spring-loaded screws.

3. A fluid damper according to claim 2 wherein said cover of the damper housing further comprises a center shaft about which the drum wheel is supported for rotation.

4. A fluid damper according to claim 3 wherein said drum wheel further comprises an inner hub which is supported for rotation on said shaft, a plurality of spokes and an outer ring corresponding to the slipping ring so that said gap spacing is formed between the cylindrical outer surface of the drum wheel and the inner cylindrical surface of the slipping ring.

5. A fluid damper according to claim 4 wherein an annular fluid gap is formed between the drum wheel and the damper housing said fluid gap also including said gap spacing.

6. A fluid damper according to claim 5 wherein said fluid gap is fluid-tight by means of two dynamic annular seals disposed between the hub of the drum wheel and the cover and bottom part of the damper housing and two O-rings disposed in the cylindrical outer wall of the damper housing between the slipping ring and the cover and bottom part.

7. A fluid damper according to claim 6 wherein additional spacing is formed next to said fluid gap but divided from it by means of a membrane to even out pressure differences of the damping fluid.

8. A fluid damper according to claims 1 or 3 wherein said slipping ring is made of a material which is temperature stable and which can be made with a high accuracy with respect to its dimensions.

9. A fluid damper according to claims 6 or 7 wherein said slipping ring is made of a material which is temperature stable and which can be made with a high accuracy with respect to its dimensions.

10. A fluid damper according to claim 7 wherein said slipping ring is made of carbon-fibre reinforced epoxy resin.

* * * * *